Fig. 2.

Nov. 5, 1929.　　　G. D. SUNDSTRAND　　　1,734,308
MILLING MACHINE
Filed Nov. 30, 1925　　　8 Sheets-Sheet 3

Fig. 3.

Inventor:
G. D. Sundstrand,
By Chindahl, Parker & Carlson
Attys.

Fig. 5.

Nov. 5, 1929.  G. D. SUNDSTRAND  1,734,308

MILLING MACHINE

Filed Nov. 30, 1925   8 Sheets-Sheet 6

Inventor:
G. D. Sundstrand,
By Chindahl, Parker & Carlson
Attys.

Patented Nov. 5, 1929

1,734,308

UNITED STATES PATENT OFFICE

GUSTAF D. SUNDSTRAND, OF ROCKFORD, ILLINOIS, ASSIGNOR, BY MESNE ASSIGNMENTS, TO SUNDSTRAND MACHINE TOOL CO., OF ROCKFORD, ILLINOIS, A CORPORATION OF ILLINOIS

MILLING MACHINE

Application filed November 30, 1925. Serial No. 72,072.

The invention relates to milling machines and has for its general aim the provision of a milling machine which is especially adapted for large volume production.

More particularly the invention relates to milling machines of the type commonly referred to as continuous millers, in which a plurality of pieces of work are mounted upon a rotary work support or turret and moved successively into operative association with the milling cutter.

The primary object of my invention is to produce a milling machine of the general character set forth in which two pieces of work are operated upon simultaneously, thus increasing the rate of production.

Another object of my invention is to produce a machine of wide application so as to be capable of performing milling operations of different kinds as may be required. To this end I provide a construction and arrangement whereby (first) the rotary work support or turret may be revolved constantly to carry the work continuously through the milling cutter or cutters mounted on axes held stationary; whereby (second) the turret may be driven to feed the work through the cutters and then rapidly indexed for a repetition of the cycle; and whereby (third) the turret may be rapidly indexed to position the work relative to the milling cutters, the latter being reciprocated first to feed into engagement with the work and then to return from the work while the turret is indexing to position the succeeding piece of work.

Still another object is to provide a construction and arrangement of the parts such that the control drums or disks are readily accessible for purposes of adjustment, the control levers positioned for the convenience of the operator, and the rotary work support or turret arranged for the loading and unloading operation with the expenditure of a minimum amount of effort and time by the operator.

A further object is to produce a milling machine of this character which may embody both roughing and finishing cutters operating on the work in succession with a single setting-up thereof on the work support; or in which, as an alternative arrangement, two sets of roughing cutters may be employed and the work arranged in staggered relation on the turret so that the two pieces are presented at a time to the two cutters.

Another object is to provide a milling machine wherein the cutter is movable relatively to the main supporting frame embodying means for supporting the cutter for such movement arranged to maintain exact alinement of the cutter arbor and spindle at all times and to support the outer end of the cutter arbor directly from the machine frame during a cutting operation.

The object of the invention thus generally set forth, together with other and ancillary advantages are obtained by the construction and arrangement shown in the accompanying drawings forming part hereof and illustrating the preferred embodiment of the invention. It should be understood, however, that while I have shown a single embodiment only, it is contemplated that various changes and modifications may be made by those skilled in the art without departing from the spirit and scope of the invention as expressed in the appended claims.

Fir. 6ᵃ is a view illustrating the driving gears for the spindle head and turret.

Figure 1:
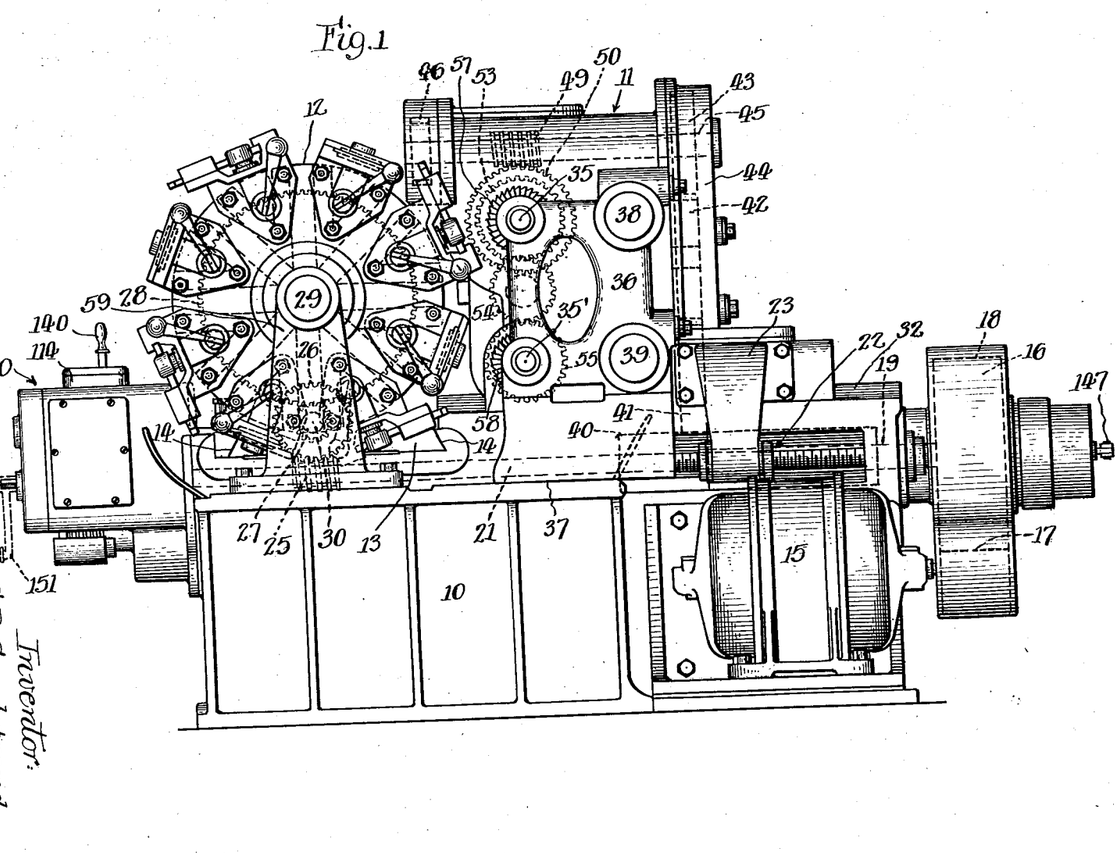
Figure 1 of the drawings is a side elevational view of my improved machine.
Figure 2:
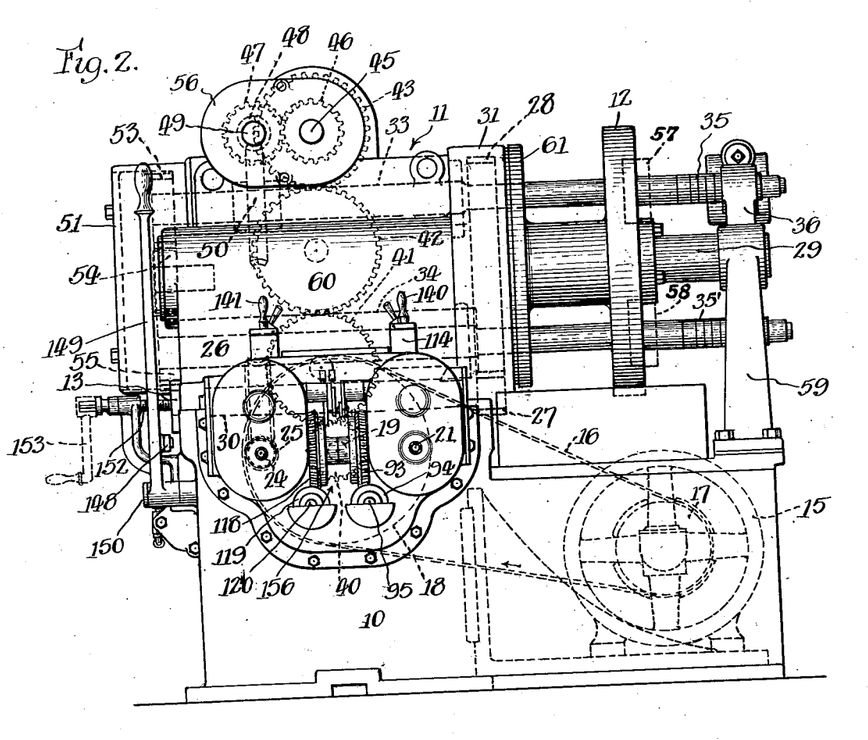
Fig. 2 is a front view with the work omitted from the turret.

Referring first to Figs. 1 and 2, the machine comprises in its preferred form, a base 10 upon the rear end of which is mounted for longitudinal reciprocatory motion a spindle-carrying head generally designated by the numeral 11. On the forward end of the base is a rotary work support or turret 12 mounted on a slide 13 for adjustment transversely of the base in ways 14. Herein an electric motor 15 is provided as the source of power. This motor is mounted on the base near the rear end thereof and is connected by a belt 16 running over pulleys 17 and 18 with a main drive shaft 19 suitably journalled in the base and extending longitudinally thereof. At its forward end the shaft 19 extends a short distance into and terminates centrally of a feed box 20 removably secured at the forward end of the base. This feed box contains the driving connections and controlling mechanism for effecting the reciprocatory movements of the spindle head 11 at high and low speeds in opposite directions, and the rotary movements of the turret 12 at feeding and indexing speeds in the same direction.

In the case of the spindle head, power is transmitted from the main drive shaft 19 through the feed box to a screw shaft 21 located to the right and parallel to shaft 19 and extending rearwardly for connection with the spindle head through the usual nut and screw arrangement 22 (Fig 1). Herein the screw is held against axial movement, and the nut is mounted in a bracket arm 23 fast on the head.

In the case of the turret, the drive is through the feed box to a shaft 24 located to the left of and parallel to the shaft 19 and having a worm 25 thereon meshing with a worm wheel 26, the latter in turn being connected by a spur pinion 27 and gear 28 with the turret shaft 29. The worm wheel is mounted on a shaft 30 (Fig. 3) carrying the pinion 27, which latter together with the gear 28 are enclosed in a suitable housing 31 provided on the main frame.

Figure 3:
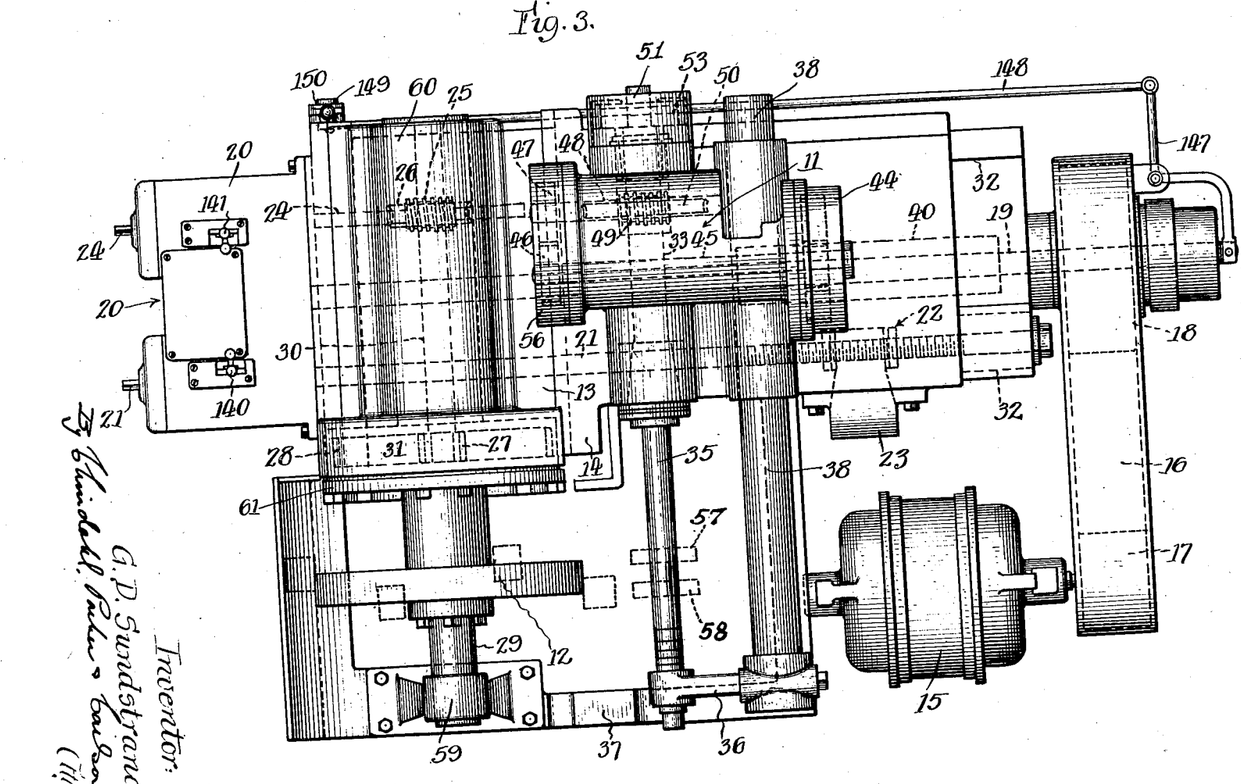
Fig. 3 is a plan view of the machine.

The spindle head 11 is mounted upon the base 10 for longitudinal reciprocation, on suitable ways 32 (Fig. 3). This head is constructed to provide near its forward end portion transverse bearings disposed one above the other for two cutter spindles 33 and 34, the latter being shown as equipped with two cutter-carrying arbors 35 and 35' mounted at their free ends in an upright standard 36, said standard being mounted on a slideway 37 on the base for movement with the head.

Rearwardly of the spindles 33 and 34 the head has mounted therein a pair of arms or shafts 38 and 39 of relatively large diameter, these shafts constituting, in effect, overarms and having rigidly secured at their outer ends the upright standard 36. Herein the standard is in the form of a rectangular frame and it will be observed that the cutter arbors 35 and 35' are located directly forwardly of the arms 38 and 39 so that the latter receive the rearward thrust on the cutters. Thus it will be seen that a rigid construction is provided so as to hold the cutters firmly to the work and thus avoid any chattering. Also it will be observed that the axis of the milling cutters are located equidistantly above and below the plane of the axis of the turret 12. By this arrangement it is possible to position two pieces of work simultaneously to the two cutters.

The spindles 33 and 34 are driven from the main drive shaft 19 through change speed gear trains. Herein I have provided for this purpose a pinion 40 fast on the main shaft 19 and meshing with the lower-most one of a series of gears 41, 42 and 43 suitably mounted at the rear side of the head in a gear box 44. The uppermost gear 43 is fast on a longitudinally disposed shaft 45 journalled in the upper portion of the head, and on the extreme forward end of this shaft is a pinion 46 meshing with a laterally offset gear 47 mounted on a parallel shaft 48 (Fig. 3). Said shaft 48 has a worm 49 thereon meshing with a worm wheel 50 fast on the upper spindle 33. The lower spindle 34 is driven from the upper spindle which extends laterally to the left (Fig. 2) and is connected by a gear train 53, 54 and 55 with the lower spindle. This gear train is enclosed in a suitable gear box 51 and the gears 46 and 47 are enclosed within a gear box 56 (Figs. 2 and 3). These boxes and also the box 44 at the opposite or rear side of the head are preferably constructed so that the gears are accessible for the purpose of changing the gear ratios as desired to vary the relative speeds of the two spindles. The milling cutters are suitably mounted on the upper and lower arbors 35 and 35' in any usual or preferred manner as indicated at 57 and 58 (Fig. 1).

To permit of the reciprocation of the head while maintaining the driving connection between the gear 41 and the gear 40, the latter being on the main shaft, said gear 40 is made of substantial length as indicated in Figs. 1 and 3.

The shaft 29 on which the turret 12 is mounted is supported near the forward end of the base in the upper end of a standard or bracket 59 and in a bearing head 60, the bracket being spaced outwardly from the head as shown clearly in Fig. 3 and the turret being supported on the shaft substantially midway between the bearing and the bracket. The housing 31 enclosing the turret driving gears 26, 27 and 28 is formed at the end of the bearing head 60 adjacent the turret, and this box is preferably closed by a removable cover plate 61. Any suitable or preferred work holding devices may be provided for the turret.

The feed box 20 is secured at the forward end of the frame, and for assembling purposes the shafts 19, 21 and 24 (Fig. 4) are severed adjacent the rear walls of the feed box, the adjacent ends being joined by suitable coupling devices (not shown) so that, in effect, when the machine is fully assembled, said shafts extend from the feed box into the base of the machine.

Figure 4:
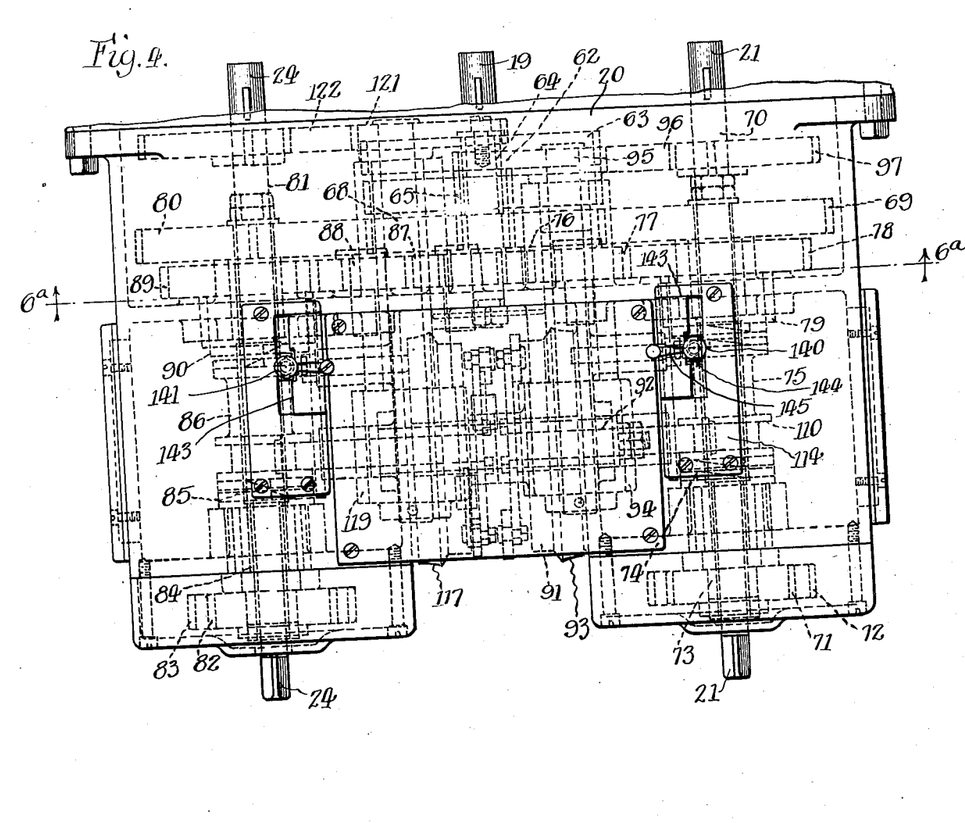
Fig. 4 is a fragmentary plan view of the feed box, located at the front end of the machine.
Figure 5:
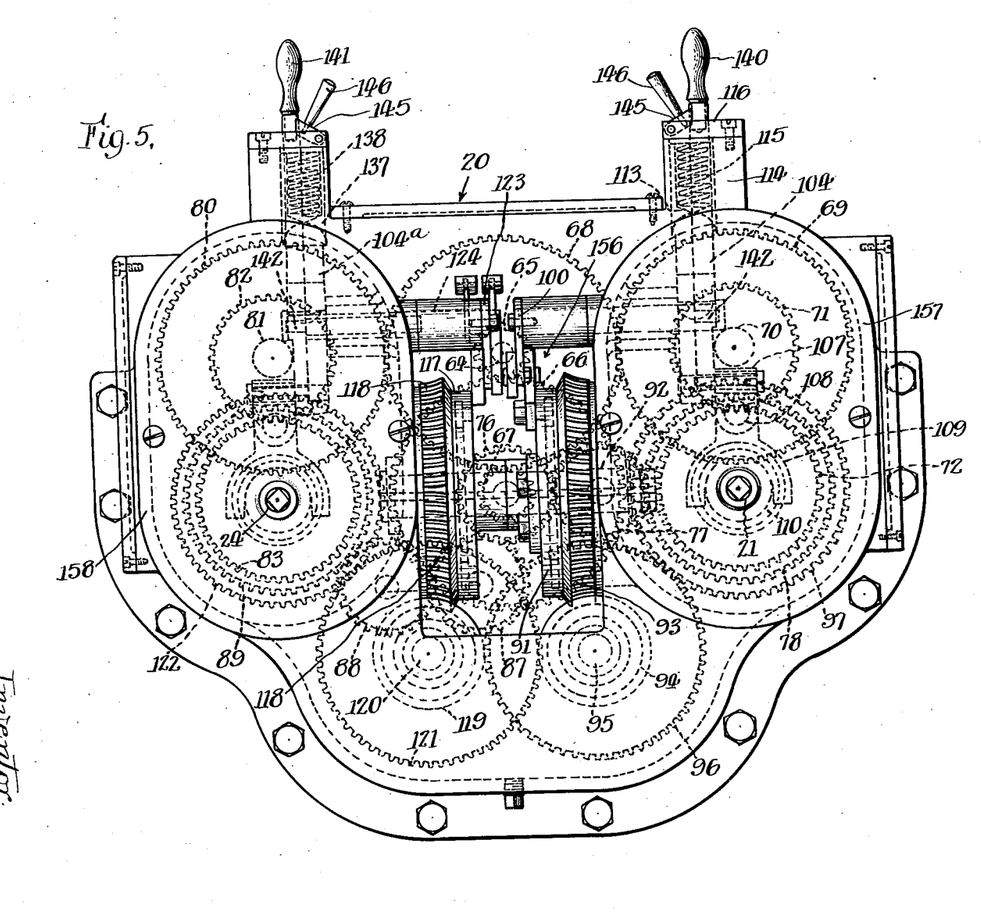
Fig. 5 is a front elevational view of the feed box.
Figure 11:
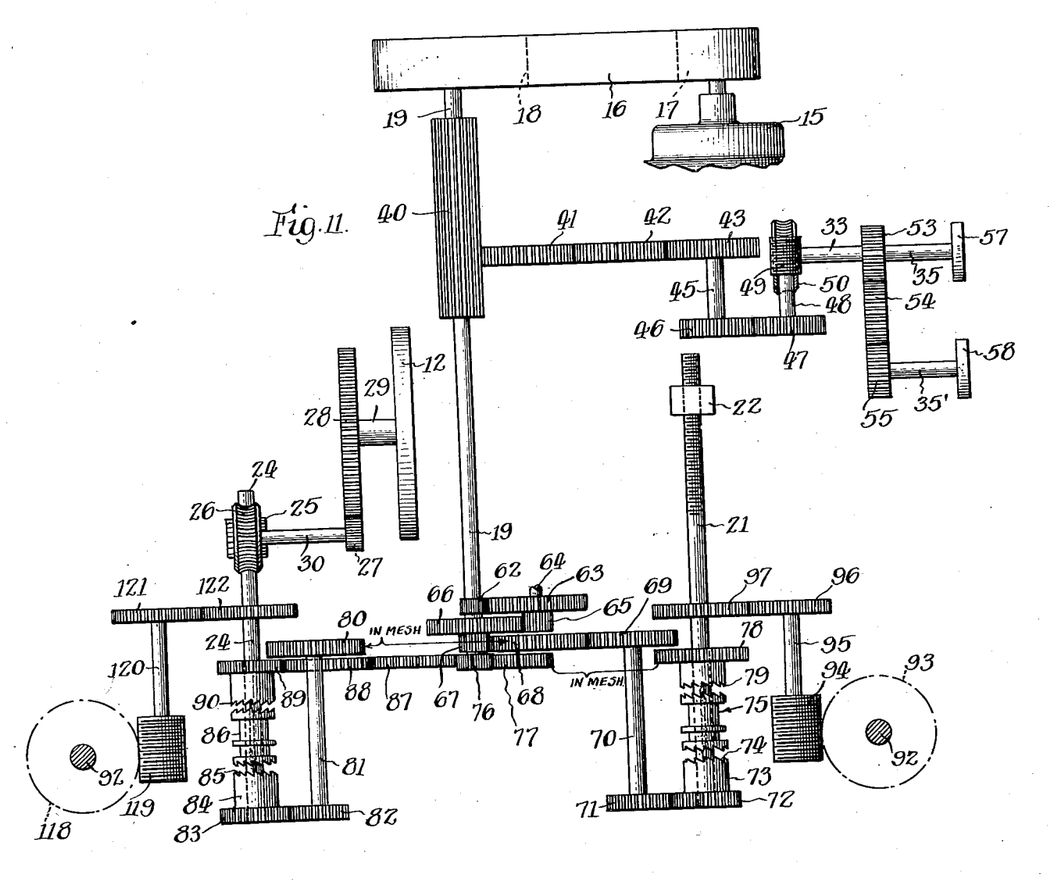
Fig. 11 is a diagrammatic view showing the general arrangement of the gearing for operating various parts of the machine.

Referring now to Figs. 4, 5 and 11, the general arrangement is such that power may be communicated from the shaft 19 to the screw shaft 21 at either low or high speed for feeding the cutters to the work and for rapidly returning the cutters from the work, and similarly power is communicated from the shaft 19 to the turret drive shaft 24 at either low speed for feeding purposes or at high speed for rapid movement of the work in indexing into and out of operative relation to the cutters. In each instance, the rate of feed, and in the case of the screw shaft, the direction of rotation is under the control of the rotary disk or drum operatively associated with the shaft controlled thereby.

The low speed connection between the shaft 19 and the shaft 21 comprises a driving pinion 62 fast on the shaft 19 and meshing with a gear 63 directly above it mounted loosely on a shaft 64 substantially in the upper central portion of the feed box. Rigid with the gear 63 is a pinion 65 meshing with a gear 66 directly below it and loose on the shaft 19. A pinion 67 rigid with the gear 66 drives up to a gear 68 on the shaft 64.

From this gear 68 power is communicated in opposite directions to the screw shaft 21 and the turret shaft 24 at low speeds. Referring first to the operation of the shaft 21, the gear 68 meshes with a gear 69 on a shaft 70 disposed parallel to the shaft 64 and to the right (Fig. 5), said gear 69 being fast on its shaft. The latter extends forwardly across the feed box and carries a relatively smaller gear 71 rigid therewith which meshes with a gear 72 loosely mounted on the forward end of the main screw shaft 21 through the medium of a sleeve 73 with which the gear is rigid. Fast on the inner end of the sleeve is a clutch member 74 adapted to coact with a movable double clutch member 75 splined on the shaft 21. When this clutch member 75 engages the member 74, it will be apparent, power is communicated from the main drive shaft 19 to the screw shaft 21, and the gearing is so proportioned and arranged as to drive this screw shaft at a slow speed in a counter clockwise direction, thus effecting a movement with the head to carry the cutters into engagement with the work at a feeding speed.

The driving connections for returning the head at high speed from power derived from the shaft 19 comprises a gear wheel 76 fast on the inner end of the main drive shaft 19. This gear 76 is connected through an idler gear 77 with a gear 78 loose on the screw shaft 21 but having rigid therewith a clutch member 79 adapted to be engaged by the double clutch member 75 when the latter is in its rearmost position. The gearing constituting this connection is so proportioned that power will be transmitted from the main drive shaft 19 to the screw shaft 21 in a clockwise direction (Figs. 4 and 5) at high speed so as to effect the return movement of the spindle head 11 rapidly.

The means for driving the turret 12 at low speed comprises a gear 80 (Figs. 4 and 5) meshing with the intermediate driving gear 68. Said gear 80 is fast on a shaft 81 mounted in the gear box at the left of the parallel shaft 64 and passing through the feed box. At its forward end this shaft 81 has rigidly secured thereto a pinion 82 which meshes with a gear 83 loosely mounted on the forward end of the turret drive shaft 24. The gear 83 is, however, fast on a sleeve 84 the inner end of which has teeth forming a clutch member 85 adapted to coact with a double clutch member 86 splined on the shaft 24. When this clutch member 86 is in its foremost position (Fig. 4) power communicated from the shaft 19 through the gears 68, 80, 82, 83 and clutch 85, 86 will drive the turret shaft 24 at a slow or feeding speed.

To drive the turret shaft 24 at high speed, power is communicated from the shaft 19 to the shaft 24 by means of the driving pinion 76 connected by two idler gears 87 and 88 (Figs. 4 and 5) with a gear 89 loose on the shaft 24 but rigid with a clutch member 90 adapted to coact with the rear end of the double clutch member 86. When, therefore, the clutch member 86 is in its rearmost position, a connection is established between the shaft 24 and the shaft 19 through the gears 89, 88, 87, and 76, and the arrangement is such that whether the clutch member is in either forward or rear position, the direction of movement imparted to the shaft 24 is the same, it being obvious that the turret 12 is driven in one direction only.

Figure 6:
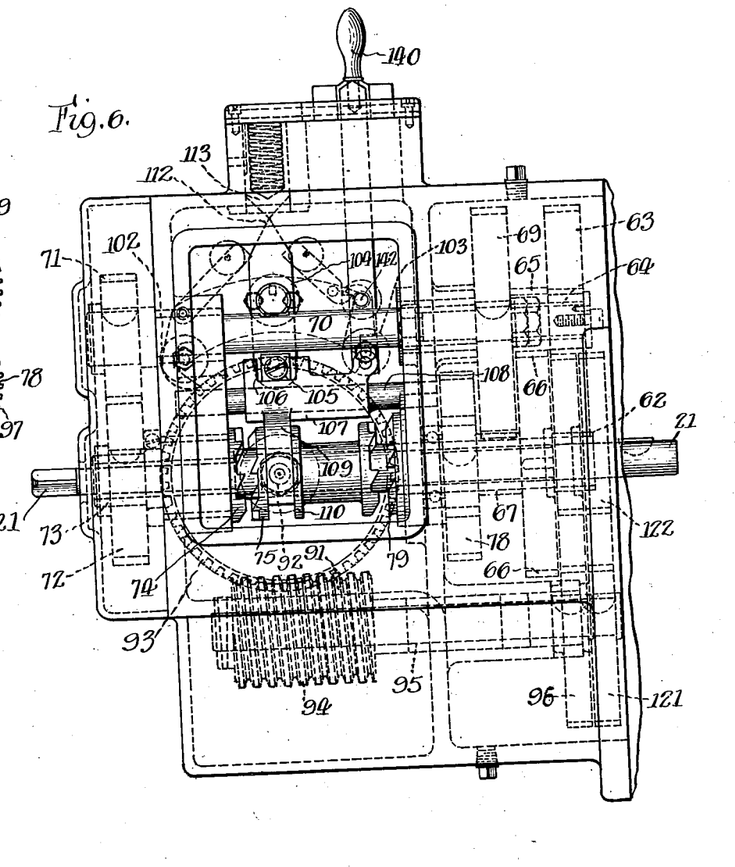
Fig. 6 is a fragmentary side view of the feed box.
Figure 6A:
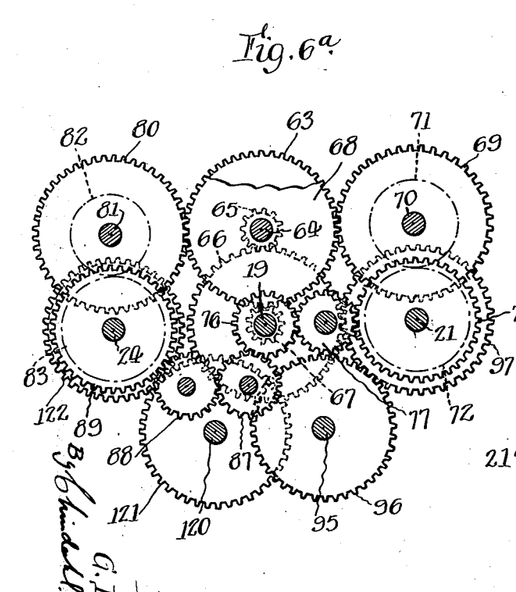

For controlling the operation of the clutch members 75 and 86 I provide two disks or drums respectively connected with the screw shaft 21 for reciprocating the spindle head and with the turret shaft 24. Referring first to the controlling of the clutch member 75, 91 indicates the drum employed for this purpose. This drum is mounted on one end of a shaft 92 arranged horizontally and substantially perpendicular to the axes of the shafts 21 and 24. Rigid with the drum 91 is a worm gear 93 meshing with a worm 94 fast on the forward end of a shaft 95 which is journalled in the lower portion of the feed box below the shaft 21 and parallel thereto (Fig. 6). The rear end of this shaft 95 has secured thereto a gear 96 which meshes with a gear 97 fast on the shaft 21 at the rear end of the feed box. The drum 91 is, therefore, driven from the shaft 21 in one direction or the other and at either low or high speed depending upon whether the shaft 21 is connected with the shaft 19 for feeding or rapid everse purposes.

Suitable means is provided for shifting the clutch member 75 in the rotation of the drum 91 comprising a pair of dogs 98 and 99 (Figs. 7 and 9) and a rocker arm 100 mounted on a stud shaft 101 and carrying rollers 102 and 103 at its opposite ends. Rigid with this arm 100 is an upright shifter arm 104 having a block 105 pivoted at its lower end and engaging in a notch 106 in a sliding member 107 operatively connected with the clutch member 75. The member 107 is slidable on the stationary shaft 108 and the connection between the member and the clutch member 75 is in the form of a depending forked arm 109 engaging in an annular groove 110 formed on the clutch member. The dogs 98 and 99 are mounted in an undercut annular slot 111 in one face of the drum 91 so as to be adjustable therein at will, and the dogs are so constructed as to be disposed respectively in the planes of the rollers 102 and 103 mounted on opposite sides of the arm 100. The arrangement is such that the dog 98 engages with the roller 102 at the forward end of the arm 100 as the spindle head moves forwardly at feeding speed to shift the clutch member 75 rearwardly, and thus interrupt the forward travel of the head; and the dog 99 engages the roller 103 at the rear end of the arm 100 as the head travels in the reverse direction, whereby to interrupt its rearward travel at high speed.

In order that the clutch member 75 will occupy either one position or the other (except when locked as hereinafter set forth) the upper end of the shifter arm 104 terminates in a point 112 which engages with the lower pointed end of a plunger 113 vertically slidable in an upstanding projection 114 on the top of the feed box. A coiled spring 115 acting between a top plate 116 and the plunger operates to complete the shifting movement of the arm 104 in either direction after the same has passed the neutral point, the arrangement being such that the dogs 98 and 99 coacting with the rollers 102 and 103 will move the arm 104 slightly beyond its neutral position in one direction or the other.

The means for shifting the turret control clutch 86 is under the control of a drum 117 (Figs. 7 and 8) also mounted on the shaft 92 in spaced relation to the drum 91. Like the drum 91, the drum 117 has rigid therewith a worm gear 118 driven from a worm wheel 119 on a shaft 120 parallel to the shaft 95 and in substantially the same horizontal plane (Fig. 5). The shaft 120 has rigid with its rear end the gear wheel 121 meshing with a gear 122 fast on the shaft 24. It will be seen, therefore, that when the shaft 24 is driven at either low or high speed, the drum 117 will also be rotated at corresponding speeds.

The clutch shifting means employed in this instance is the same in substantially all respects to that employed for shifting the clutch 75. Thus it comprises a rocker arm 123 having a shifter arm 104ª connected to the clutch 86. Said rocker arm is fast on a shaft 124 axially alined with the shaft 101. A pair of dogs 125 and 126 are arranged to engage a cam member 127 pivotally mounted on the forward end of the arm 123. At the rear end of the arm 123 is a cam member 128 adapted to be engaged by a dog 129 on the opposite drum 91. The dog 129 for this purpose is laterally offset so as to extend into the vertical plane of the cam member 128.

It will be observed that the cams 127 and 128 on the arm 123 are pivoted and that the arm is provided with stop pins 130 and 131 to limit the pivotal movements of the cam members in one direction. Operatively associated with each of the cam members is a weighted arm 132 and 133, the arm 132 being rigid with the cam member 127 and the arm 133 being pivoted at 134 and having a toe 135 engaging a hook 136 on the upper end of the cam member 128. It will be seen that by this arrangement the weighted arms normally tend to hold the cam members away from their respective stop pins 130 and 131 and that the dogs 125, 126 and 129 which coact with these cam members slidably engage therewith so that in the movement of the cam members toward their stop pins the wear on the parts is distributed. On the other hand the pivotal mounting of the cam members ensures that they will be ineffective to rock the shaft 124 except when moving in a direction such as to move the cam members toward their stop pins.

As in the case of the clutch 75, spring means is provided for completing the movement of the clutch 86 in one direction or the other, this means being in all substantial respects similar to that previously described in connection with the clutch 75. Thus it includes a plunger 137 which is urged by a spring 138 toward the pointed upper end of the shifter arm 104ª rigid with the shaft 124.

In the case of both clutches, hand levers 140 and 141 are provided for manually shifting the clutches, each of these hand levers being pivoted on a stationary pin 142 between its ends and pivotally connected to a clutch shifting slide member 107. The upper ends of the levers operate in guide slots 143 (Fig. 4) each having centrally thereof a transverse recess 144 adapted to receive the upper end of the lever, the pivotal mounting of the latter being such as to permit a slight lateral swinging motion. A pivoted locking dog 145 is provided to hold the lever in its recess 144, said dog being provided with a handle 146 (Fig. 5).

The main control for starting and stopping the machine may comprise a suitable clutch at the rear end of the machine adapted to connect the pulley 18 with the shaft 19. This clutch may be operated by means of a bell-crank lever 147, and a link 148 extending forwardly to the front end of the machine where it is connected to a hand lever 149 pivoted to the base at 150.

The forward ends of the shafts 21 and 24 are preferably extended through the feed box and suitably constructed to receive a hand crank 151 (Figs. 1 and 2) whereby the spindle head may be moved manually toward or from the turret and whereby the turret may be rotated manually to any desired position. In order that the turret may be adjusted laterally and thus vary the position of the work relative to the cutters, I provide a transverse screw shaft 152 (Fig. 2) having a screw-threaded engagement with the slide 13 in a well known manner, and adapted to receive at its outer end a crank 153.

To provide for the convenient adjustment of the dogs on the control drums 91 and 117, the feed box is constructed to form a central forwardly opening chamber 156 (Fig. 5) located forwardly of the drive shaft 19 and between the two driven shafts 21 and 24.

In performing some milling operations, the spindle head may be held stationary with the cutters presented to the work and the work fed through the cutters, the work support revolving constantly at one speed. In other cases where the cutting time is relatively short, the work support may be revolved at two different speeds so as to carry the work through the cutters at one speed and to move the work from the cutters while presenting new pieces of work thereto at high speed. In other instances, the work may be moved into cutting positions and held stationary while the cutters are moved into engagement therewith at a slow or feeding speed and then moved out of engagement with the work while the work support is indexed at high speed to present new pieces of work to the cutters. The machine which I have produced is capable of operating to perform these several operations as well as modifications thereof.

Thus where the cutter spindles are held stationary in operative positions and the work support revolved continuously at a constant speed to carry the work through the cutters, the controlling lever 140 for the clutch 75 may be locked in neutral position by means of the dog 145 on the said lever, thus preventing the operation of the feed screw. Or as an alternative, the feed gears 71 or 72 at the front end of the feed box may be removed, it being noted that these gears and also the gears 82 and 83 for the turret are enclosed in removable housings 157 and 158 so as to be readily removable. Also, where the turret is to revolve continuously the controlling dogs on the turret drum 117 would be removed, the clutch 86 being operated by its control lever 141 into engagement with either the slow or high speed drives as desired.

For the operation of the machine where the work is moved into cutting position and held stationary while the cutters are fed into and out of engagement with the work, one of the front turret low speed feed gears 82, 83 is removed to allow the turret to remain stationary during the cutting feed. The operation is then as follows:

The arrangement is preferably such that the rotary work support or turret is indexed while the spindle head is in or near its rearmost position. Therefore, during the initial portion of the rearward movement of the spindle head, the turret remains stationary with the turret clutch member 86 in its forward position and engaged with the clutch member 85 (one of the gears 82, 83 being removed). Assuming then that the turret is stationary and the head is moving rearwardly at high speed, then the spindle head clutch member 75 is in its rearward position and the turret clutch member 86 is in its forward position. The shaft 21 for moving the head rearwardly receives its power from the drive shaft 19 through gears 76, 77 and 78 and clutch members 79 and 75 so as to rotate in a counter-clockwise direction (Figs. 4 and 5). Also the drum 91 being geared to the shaft 21 is rotating to effect a shifting of the clutch 75 at the end of the return movement of the head. In such rotation of the drum 91, the clutch member 86 is first shifted to effect an indexing operation of the turret. Thus referring to Figs. 7, 8 and 9, as the spindle head moves rearwardly, the dog 129 on the drum 91 engages the rear cam member 128 on the rocker arm 123, it being remembered that this dog 129 extends laterally into the plane of this cam member 128. The rocker arms 123 is accordingly rocked to shift the clutch member 86 rearwardly and thus effect the rotation of the turret at high speed. For this purpose power is communicated from the main drive shaft 19 through gears 76, 87, 88, 89 and clutch members 90 and 86 to the turret drive shaft 24. The turret thus rotates until interrupted by the engagement of the cam 127 by one of the dogs 125 or 126 on the drum 117. The clutch 86 is then shifted forwardly to its slow feed position in engagement with the clutch member 85, but inasmuch as one of the gears 82, 83 is removed, the turret remains stationary. In the present instance where two milling cutters are employed, the arrangement is such that two pieces of work are simultaneously presented opposite the cutters.

As the spindle head approaches its rearward position, the dog 98 on the drum 91 moves upwardly and rearwardly striking the roller 102 on the rocker arm 100 and thus shifting the clutch member 75 forwardly. As a result, the head moves forwardly at feeding speed. In such reverse movement of the spindle head, the drum 91 likewise reverses carrying the dog 99 into engagement with the roller 103 at the end of the forward movement of the head, thus shifting the clutch member 75 and causing the head to move rearwardly at high speed while the dog 129 strikes the cam 128 as above set forth, to shift the clutch member 86 rearwardly to again index the turret.

Usually with my double spindle arrangement, when it is desired to make both roughing and finishing cuts it is preferable to employ the upper milling cutter as a roughing cutter and the lower milling cutter for finishing. This ensures a longer life for the cutters since even though the roughing cutter may become somewhat dull the finishing cutter will ensure a smooth surface. Ordinarily separate roughing and finishing operations require two settings of the work, but this is eliminated with my construction and arrangement.

If it is desired to perform the same character of operation with both cutters, this may be accomplished by locating the cutters in different vertical planes and staggering the work upon the turret so that alternate pieces of work are located on opposite sides. In this event the controlling dogs on the drums are so arranged as to index the turret two stations at a time instead of one, the drums being preferably geared make one revolution during such a two station movement of the turret as in the combined roughing and finishing operation above described. The staggered arrangement of the work holding stations together with the offset relation of the two cutters is illustrated in Fig. 3.

Figures 7, 9, 10:
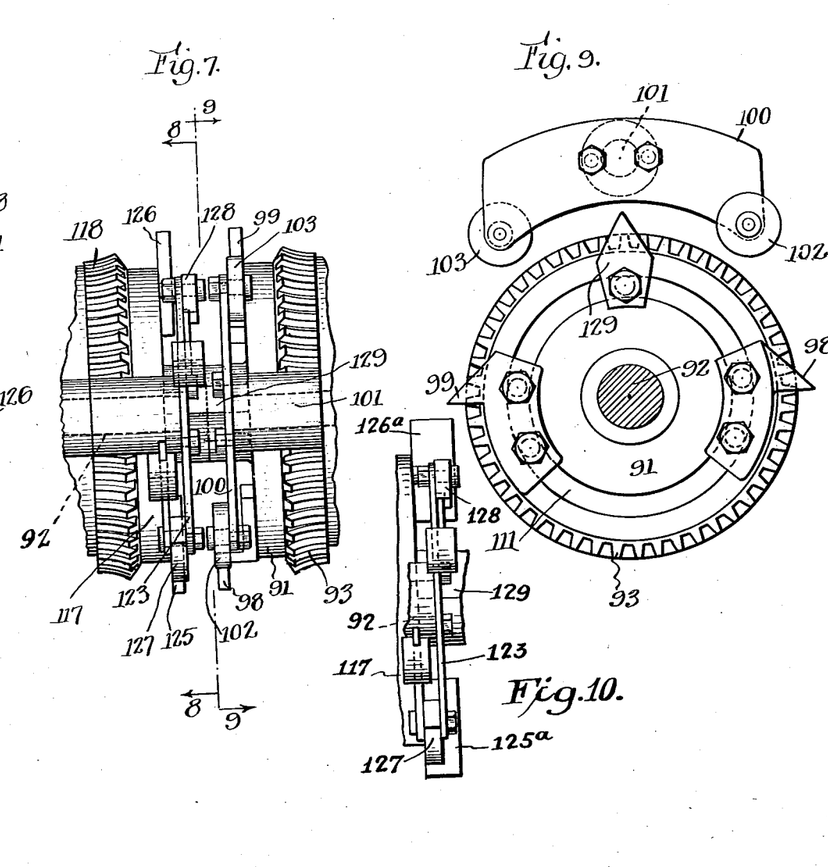
Fig. 7 is a fragmentary plan view of two controlling disks or drums and clutch shifting rocker arms operatively associated therewith.
Figs. 8 and 9 are respectively sectional views taken in the planes of lines 8—8 and 9—9 of Fig. 7.
Fig. 10 is a fragmental view similar to a portion of Fig. 7 showing a modified form of dogs.
Figure 8:
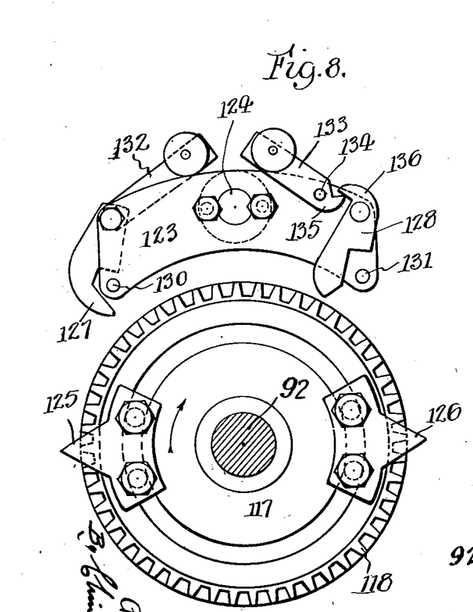

For operating the turret intermittently at slow and high speeds while the spindle head is stationary, the following arrangement is employed: One of the feed gears 71, 72 is removed or the lever 140 locked in neutral position so as to ensure that the feed screw 21 shall be inoperative to move the spindle head. Assuming that the clutch 86 for controlling the turret is in its rear position, the turret shaft 24 is driven at high speed by power communicated from the drive shaft 19 through the gears 76, 87, 88, 89 and the clutch members 90 and 86. In the rotation of the turret shaft, the control drum 117 is also driven so as to carry the dogs 125 and 126 successively into engagement with the cams 127 and 128 of the clutch shifting mechanism. For this set-up thicker dogs 125$^a$, 126$^a$ may be substituted for the dogs 125, 126, these dogs being arranged to operate in the plane of both cam members 127 and 128 as shown in Fig. 10. When the cam 127 is struck by a dog, the clutch 86 is shifted forwardly into engagement with the clutch member 85 whereupon the turret is rotated at slow speed through the gears 83, 82, shaft 81 and gears 80 and 68. The direction of rotation of the drum, however, is the same so that subsequently the engagement of the cam member 128 operates to shift the clutch member 86 rearwardly and thus again rotate the turret at high speed. It will be understood that in this operation the work is moved rapidly into operative engagement with the cutters, then fed slowly through the cutters and then moved rapidly out of engagement with the work while new pieces of work are positioned for operative engagement with the cutters.

I claim as my invention:

1. A machine of the character described comprising, in combination, a base, a spindle head reciprocably mounted on the base, a rotary work support adapted to carry a plurality of work pieces also mounted on the base, said head having a pair of cutter arbors disposed one above the other in spaced relation and parallel to the axis of said work support, and means for automatically indexing said work support to thereby position the work pieces opposite said cutters and for moving said head to carry the cutters into and out of engagement with two pieces of work simultaneously.

2. In a milling machine of the class described, the combination of a base, means on the base for rotatably supporting a pair of milling cutters on spaced parallel axes, rotatable means on the base for supporting separate pieces of work in spaced peripheral relation about an axis parallel to said cutter axes and adapted to present two pieces of work simultaneously opposite the two milling cutters, and means for effecting relative rectilinear feeding movement between the cutters and the work in a direction perpendicular to a plane through the cutter axes.

3. In a milling machine of the class described, the combination of a base, means on the base for supporting a pair of milling cutters on spaced parallel axes, a rotary work support mounted on the base on an axis parallel to said cutter axes, and means for effecting a relative rectilinear feeding movement between work on said support and said two cutters simultaneously.

4. In a milling machine of the class described, the combination of a base, means on the base for supporting a pair of milling cutters on spaced parallel axes, a rotary work support mounted on the base on an axis parallel to said cutter axes, automatic means for indexing said support to position two pieces of work simultaneously opposite said cutters, and means for effecting relative rectilinear reciprocating feeding movement between the cutters and the pieces of work so positioned.

5. In a milling machine of the class described, the combination of a base, means on the base for supporting a pair of milling cutters on spaced parallel axes, a rotary work support mounted on the base, and means for automatically rotating the work support alternately at feeding and indexing speeds relative to said cutters, said means including a control drum geared to rotate with and at a higher speed than said work support.

6. In a milling machine of the class described, the combination of a rotary work support and a spindle-carrying head mounted for relative movement toward and from each other, said head having a pair of arms extending laterally therefrom and rigidly secured to the head, an upright member rigidly secured to said arms in spaced relation to the head, and a pair of cutter spindles mounted in said head, a pair of cutter arbors, each having one end carried by one of said spindles and having their outer ends journalled in said upright member, said arbors being adapted to support milling cutters in the space between said upright member and the head, and means for effecting relative feeding movement between the work on said support and said cutters.

7. In a milling machine of the class described, the combination of a rotary work support, a head having a pair of spindles journalled therein and disposed one above the other in spaced parallel relation, the axis of said rotary work support being located parallel to and substantially in a plane midway between the axes of the two spindles, and means for effecting relative rectilinear reciprocating feeding movement between the work and milling cutters supported by said spindles.

8. In a milling machine of the class described, the combination of a base, a head mounted on one end of the base and having a pair of cutter spindles journalled therein one above the other in spaced parallel relation, a pair of cutter arbors each having one end carried by one of said spindles, an outboard support for the free ends of the arbors comprising an upright member supported directly on the base, and a rotary work support mounted on an axis parallel to the axes of the spindles in a plane substantially midway between the axes of the two spindles, and means for effecting relative feeding movement between the work on said support and cutters on said arbors.

9. In a milling machine of the class described, the combination of a base, a head mounted for sliding movement on the base and having a pair of cutter spindles journalled therein, a pair of cutter arbors each having one end carried by one of said spindles, an outboard support for the free ends of the arbors comprising an upright member also slidably supported on the base in spaced relation to the head, said head having a pair of arms extending laterally therefrom and connecting said upright member rigidly to the head for movement therewith, and means for supporting separate pieces of work for simultaneous engagement by cutters on said arbors.

10. In a milling machine of the class described, the combination of a base, a head mounted for sliding movement on the base and having a pair of cutter spindles journalled therein, a pair of cutter arbors each having one end carried by one of said spindles, an outboard support for the free ends of the arbors comprising an upright member also slidably supported on the base in spaced relation to the head, said head having a pair of arms extending laterally therefrom and connecting said upright member rigidly to the head for movement therewith, means for rotatably supporting separate pieces of work for simultaneous presentation to milling cutters on said arbors, and means for reciprocating the head to move said cutters into and out of engagement with pieces of work presented thereto.

11. A milling machine of the class described comprising, in combination, a base, a head slidably mounted on the base and having a cutter spindle journalled therein, a cutter arbor having one end carried by said spindle, an upright support also slidable on and having its weight supported by the base and rigidly secured to the head in spaced relation thereto, said support providing a journal bearing for the outer end of the arbor, means for supporting the work to be operated upon, and means for moving said head to carry a cutter on said arbor into and out of engagement with the work including a screw shaft mounted in the base and operatively connected with said head.

12. In a milling machine of the class described, the combination of a base, a head mounted for sliding movement on the base, a pair of cutter spindles journalled in the head in spaced parallel relation and disposed one above the other, a pair of cutter arbors each having one end carried by one of said spindles, a pair of arms rigidly secured in the head and disposed approximately in the horizontal planes of the two spindles rearwardly thereof, an upright member slidable on the base and rigidly secured to said arms at their outer ends, said members having the outer ends of the cutter spindles journalled therein, and means for positioning separate pieces of work simultaneously for operative engagement by the respective cutters.

13. In a milling machine of the class described, the combination of a base, a head mounted for sliding movement on the base, a pair of cutter spindles journalled in the head in spaced parallel relation and disposed one above the other, a pair of cutter arbors each having one end carried by one of said spindles, a pair of arms rigidly secured in the head and disposed approximately in the horizontal planes of the two spindles rearwardly thereof, an upright member slidable on the base and rigidly secured to said arms at their outer ends, said members having the outer ends of the cutter arbors journalled therein, a drive shaft, means operative to drive the respective spindles at different speeds, and means for moving separate pieces of work into positions to be engaged respectively by said milling cutters simultaneously.

14. In a milling machine of the class described, the combination of a rotary work support, means for supporting a pair of milling cutters in spaced parallel relation on axes disposed equi-distantly from a plane passing through the axis of the work support and parallel thereto, means for rotating said work support at different speeds, and means for effecting relative rectilinear feeding movement between two pieces of work and the respective cutters simultaneously.

15. In a milling machine of the class described, the combination of a base, a head mounted for reciprocation on the base, a rotary work support, a drive shaft, a second shaft operatively connected with the head, a third shaft operatively connected with the work support to rotate it, two separate trains of gearing providing connections between said drive shaft and the second and third shafts respectively to drive them at two speeds, and means including clutches operable to render either of said separate trains effective.

16. In a milling machine of the class described, the combination of a base, a head mounted for reciprocation on the base, a rotary work support, a drive shaft, a second shaft operatively connected with the head, a third shaft operatively connected with the work support to rotate it, two separate trains of gearing providing connections between said drive shaft and the second and third shafts respectively to drive them at two speeds, including a clutch for each of said second and third shafts, and means operating automatically to actuate said clutches whereby to control the movements of the head and the work support at high and low speeds.

17. In a milling machine of the class described, the combination of a base, a head having a cutter spindle journalled therein mounted for reciprocation on the base, a rotary work support also mounted on the base, a drive shaft, a second shaft operatively connected with the head, a third shaft operatively connected with the work support, two separate trains of driving connections between said drive shaft and each of the second and third shafts, and automatic means for rendering either of said trains effective for driving their respective shaft selectively.

18. A milling machine of the class described comprising, in combination, a rotary work support and a cutter spindle head mounted for relative movement toward and from each other, and means for controlling the movements of the support and the relative movement between the support and the head including a pair of drums respectively associated with the head and with the work support, a pair of clutches arranged to be operated by the respective drums, one of said drums being also adapted to operate the clutch controlled by the other drum.

19. In a milling machine of the class described, the combination with a rotary work support and a cutter head mounted on parallel axes for relative movement toward and from each other, of a drive shaft, a pair of shafts respectively connected with the work support and with the head, and clutch-controlled operative connections between said drive shaft and said pair of shafts operable to rotate the work support in one direction and to effect relative movement between the work support and the head in opposite directions.

20. In a milling machine of the class described, the combination with a rotary work support and a cutter head mounted on parallel axes for relative movement toward and from each other, of a drive shaft, a pair of shafts respectively connected with the work support and with the head, and clutch-controlled operative connections between said drive shaft and said pair of shafts operable to rotate the work support in one direction and to effect relative movement between the work support and the head in opposite directions, said operative connections further including means for moving the head in opposite directions at different speeds.

21. In a milling machine of the class described, the combination of a rotary work support, a head having a pair of cutter spindles mounted therein, a rotary work support having a plurality of work supporting stations adapted to present two pieces of work simultaneously to cutters mounted on the two spindles, a drive shaft, a second shaft operatively connected with the work support, clutch-controlled means operable to connect said second shaft with the drive shaft for rotation in one direction at different speeds whereby to move separate pieces of work simultaneously at high speed into engagement with said milling cutters and then at low or feeding speed through said milling cutters, and means controlling said clutch-controlled means including a drum geared to rotate simultaneously with and faster than said work support.

22. A milling machine of the class described comprising a rotary work support, means for rotatably supporting a cutter, a drive shaft, a second shaft operatively connected with the work support, two separate trains of operative connections between the drive shaft and said second shaft, each including a clutch common to both driving connections, and means operating automatically to control said clutch to render said driving connections effective selectively, said means including a drum making a complete revolution during each two cycles of operation of the clutch member.

23. In a machine of the class described, a reciprocable spindle supporting head, a rotary work support, and a feed mechanism comprising, a drive shaft, a pair of shafts to be driven, operatively connected one each to said head and work support, two separate trains of driving connections between said drive shaft and each of the pair of shafts, and means for rendering either train between the driving shaft and said pair of shafts effective including clutch members common to the separate trains, and means for automatically operating said clutch members.

24. In a milling machine, feed mechanism comprising a drive shaft, a pair of shafts to be driven spaced on opposite sides of the drive shaft and parallel thereto, two separate trains of driving connections between said drive shaft and each of the pair of shafts having a controlling clutch common thereto, a pair of drums operatively connected with the respective shafts to be driven, said drums being mounted between said pair of shafts on an axis substantially perpendicular thereto, rocker arms for each of the clutches mounted adjacent the peripheries of said drums, and means operable in the rotation of the drums to rock said arms whereby to shift the respective clutch members.

25. In a machine of the class described, feed mechanism comprising a feed box, a drive shaft extending a short distance into the box substantially centrally thereof, a pair of shafts to be driven mounted on opposite sides of said drive shaft in spaced parallel relation thereto and extending through the box, two separate trains of driving connections between said drive shaft and each of the pair of shafts including a clutch member for rendering either of the trains effective, said feed box being constructed to provide a central open chamber in its forward portion, a pair of drums mounted in said chamber, and means operatively associated with each of the drums for actuating said clutches.

26. A milling machine comprising, in combination, a base, a cutter spindle head on the rear end of the base, a rotary work support on the forward end of the base, said head and support being mounted for relative movement toward and from each other, a feed box mounted on the forward end of the base, a drive shaft journalled in the base and terminating substantially centrally of the feed box, a pair of shafts to be driven arranged on opposite sides of the drive shaft and extending through the feed box, one of said shafts extending rearwardly for connection with the work support and the other shaft extending rearwardly for connection with the head, and means in the feed box providing operative connections between the drive shaft and the pair of shafts, each such connection including a controlling clutch and a hand lever projecting from the said box for operating the same.

27. A milling machine comprising, in combination, a base, a cutter spindle head on the rear end of the base, a rotary work support on the forward end of the base, said head and support being mounted for relative movement toward and from each other, a feed box mounted on the forward end of the base, a drive shaft journalled in the base and terminating substantially centrally of the feed box, a pair of shafts to be driven arranged on opposite sides of the drive shaft and extending through the feed box, one of said shafts extending rearwardly for connection with the work support and the other shaft extending rearwardly for connection with the head, means in the feed box providing operative connections between the drive shaft and the pair of shafts, each such connection including a controlling clutch and a drum having means for automatically controlling one clutch.

28. A milling machine comprising, in combination, a rotary work support, means for supporting two milling cutters in spaced parallel relation but laterally offset relative to each other, the axis of said support being disposed in a plane midway between the cutter axes, means for supporting pieces of work in staggered relation on said support, and means for indexing said support for positioning two pieces of work simultaneously opposite the respective cutters, said means including a control drum making approximately one revolution for each shift of the work support.

29. In a milling machine, the combination of a base, a head mounted for sliding movement on the base and having a cutter spindle journaled therein and extending transversely of said support, an arbor having one end supported by said spindle, an outboard support for the free end of the arbor comprising a pair of arms secured rigidly to said head and extending therefrom parallel to said spindle, a member mounted on the free ends of said arms and carrying a bearing for said arbor and means for supporting said bearing from said base arranged to permit of said sliding movement.

30. In a machine of the class described the combination of a movable support movable alternately at fast and slow speeds during a cycle of operation, and a feed mechanism for said support comprising a drive shaft, a driven shaft operatively connected to said support, two separate trains of driving connections between said drive shaft and said driven shaft, means for rendering either of said trains effective to drive the driven shaft, including clutch members, and means for automatically operating said clutch members, said means including a control drum geared to make one revolution during said cycle.

In testimony whereof, I have hereunto affixed my signature.

GUSTAF D. SUNDSTRAND.